US012462695B2

(12) United States Patent
Hammersla, III et al.

(10) Patent No.: US 12,462,695 B2
(45) Date of Patent: Nov. 4, 2025

(54) CONFLICT RESOLUTION FOR MALFORMED BLOCKED AIRSPACE DESIGNATIONS

(71) Applicant: GLASS AVIATION HOLDINGS, INC., Chicago, IL (US)

(72) Inventors: William Edward Hammersla, III, Mechanicsville, MD (US); Joe Galindo, Washington, DC (US); Justin P. Oberman, Chicago, IL (US); Michael Manatrizio, Atlanta, GA (US)

(73) Assignee: Glass Aviation Holdings, Inc., Chicago, IL (US)

( * ) Notice: Subject to any disclaimer, the term of this patent is extended or adjusted under 35 U.S.C. 154(b) by 460 days.

(21) Appl. No.: 17/957,357

(22) Filed: Sep. 30, 2022

(65) Prior Publication Data

US 2023/0316935 A1 Oct. 5, 2023

Related U.S. Application Data

(63) Continuation-in-part of application No. 17/706,816, filed on Mar. 29, 2022.

(51) Int. Cl.
*G08G 5/34* (2025.01)
*G08G 5/55* (2025.01)
*G08G 5/59* (2025.01)

(52) U.S. Cl.
CPC ................. *G08G 5/34* (2025.01); *G08G 5/55* (2025.01); *G08G 5/59* (2025.01)

(58) Field of Classification Search
CPC ............... G08G 5/34; G08G 5/55; G08G 5/59
USPC .......................................................... 701/122
See application file for complete search history.

(56) References Cited

U.S. PATENT DOCUMENTS

2014/0018979 A1 1/2014 Goossen et al.
2016/0180715 A1 6/2016 Burke
2017/0278409 A1* 9/2017 Johnson ............... G08G 5/0034
2018/0293898 A1* 10/2018 Redmann ............. G08G 5/0013
2020/0058225 A1* 2/2020 Heiberg ............... G08G 5/0034
(Continued)

FOREIGN PATENT DOCUMENTS

JP 2014040231 A 3/2014

OTHER PUBLICATIONS

International Search Report and Written Opinion to corresponding International Application No. PCT/US23/65016 mailed Sep. 28, 2023.

(Continued)

*Primary Examiner* — Mahmoud S Ismail
(74) *Attorney, Agent, or Firm* — Morrison & Foerster LLP

(57) ABSTRACT

In some aspects, the techniques described herein relate to a method including: receiving, by a processor, blocked airspace description data; converting, by a processor, a flight path into a plurality of latitude-longitude pairs; expanding, by the processor, the blocked airspace description data into a plurality of potential blocked airspace sub-regions, each of the potential blocked airspace sub-regions including a geographical area; identifying, by the processor, a subset of the potential blocked airspace sub-regions based on comparing flight steps between respective latitude-longitude pairs and geographic areas of the potential blocked airspace sub-regions; and using, by the processor, the subset of the potential block airspace sub-regions to adjust the flight path.

20 Claims, 7 Drawing Sheets

(56) References Cited

U.S. PATENT DOCUMENTS

| | | | | |
|---|---|---|---|---|
| 2021/0255616 | A1 | 8/2021 | Surace | |
| 2021/0351987 | A1 | 11/2021 | Gomez | |
| 2021/0351997 | A1 | 11/2021 | Luft et al. | |
| 2021/0358311 | A1 | 11/2021 | Tantardini et al. | |
| 2022/0058964 | A1 | 2/2022 | Johnson | |
| 2022/0083920 | A1 | 3/2022 | Lester | |
| 2022/0406200 | A1* | 12/2022 | Bush | G08G 5/0069 |
| 2023/0121171 | A1* | 4/2023 | Bosworth | H04L 9/0637<br>701/120 |
| 2023/0267839 | A1* | 8/2023 | Hawley | G08G 5/34<br>701/120 |
| 2023/0316936 | A1 | 10/2023 | Hammersla, III | |
| 2024/0161634 | A1* | 5/2024 | Faccin | G08G 5/55 |

OTHER PUBLICATIONS

Dorsey, "The FAA Just Made it Easier to Fly Your Drone Near Airports," pp. 1-17, The Points Guy, <URL: https://thepointsguy.com/news/faa-made-it-easier-fly-drone-near-airports/> (2018).

Hammersla III et al., Office Action dated Jul. 17, 2024, directed to U.S. Appl. No. 17/706,816; 9 pages.

Hammersla III et al., Office Action dated Nov. 21, 2023, directed to U.S. Appl. No. 17/706,816; 21 pages.

International Search Report and Written Opinion to corresponding International Application No. PCT/US23/65016 mailed Sep. 28, 2023, 13 pages.

Dorsey, "The FAA Just Made it Easier to Fly Your Drone Near Airports," pp. 1-17 (2018).

* cited by examiner

CONFLICT RESOLUTION FOR MALFORMED BLOCKED AIRSPACE DESIGNATIONS

CROSS-REFERENCE TO RELATED APPLICATIONS

This application is a continuation-in-part of, and claims the benefit of, U.S. application Ser. No. 17/706,816 filed Mar. 29, 2022 and incorporated by reference in its entirety.

BACKGROUND

Airspace systems have been continuously evolving since the invention of the airplane. The commercialization of air travel has increased the number of aircraft using national airspace systems (NAS). Governmental and some private operators (e.g., commercial space operators) have a special need to reserve air space in a NAS. This airspace that is used for these special purposes is known as special activity airspace (SAA). The SAA use is dynamic and creates inefficiencies due to the lack of predictability. Airlines and other commercial operators end up avoiding blocks of SAA when planning flight paths. These minor deviations in flight paths create small increases in the distance traveled and time spent getting to a destination. Further, in existing systems special use areas (SUAs) are frequently ill- or under-defined, resulting in flight operators overcompensating and over-adjusting flight paths to avoid such SUAs. Currently, no technical process exists for dynamically managing SAA and allowing flight paths to use such airspace.

BRIEF SUMMARY

When planning a flight plan, an operator of an aircraft will plan a route using two or more published routes, latitude/longitude, and/or fixes. Operators then submit these flight paths to an air traffic control (ATC) or similar agency for approval prior to flying. When operators create a route, they generally avoid any regions of airspace that are not capable of being flown through due to usage restrictions (e.g., SAA). If an operator includes a flight path through such a region, the corresponding flight plan will be denied by ATC, which can incur delays in such flights due to the re-submission of flight plans.

However, existing solutions for broadcasting blocked airspace are limited in nature and not updated in a reasonably frequent manner. Thus, some regions of blocked airspace may not truly be needed. Currently, when an entity reserves airspace, a manual or semi-automated process is required. For example, an entity (e.g., military base) can define a region of blocked airspace and issue a request for the blocked airspace to a coordinating agency (e.g., the Federal Aviation Administration or FAA). The coordinating agency can then approve and publish the requested blocked airspace details to other agencies (often through a network data exchange platform). Attempts at modernizing this process include the FAA's En Route Automation Modernization (ERAM) were designed to allow faster processing of route requests and in-flight route changes. However, such systems still require re-keying of data from other airspace management systems (e.g., (e.g., the Special Use Airspace Management System, SAMS, or Military Airspace Data Entry, MADE). As such, data is currently not capable of being processed in real-time or near real-time in existing airspace systems.

Given the labor-intensiveness of the process, such entities often request large time periods of blocked airspace usage (e.g., twenty-four hours) while only requiring a subset of that time. This expansion allows entities flexibility when planning flight operations in the blocked airspace but negatively impacts all other operators since operators must avoid the blocked airspace during the time requested.

For these reasons, when operators plan routes, operators will retrieve all potentially blocked airspace along an ideal route and proactively adjust the flight path to avoid blocked airspace. Operators do this despite the blocked airspace not actually being in use. As a result, many flight paths are longer than necessary to avoid blocked airspace, resulting in longer flight ties, higher fuel consumption and costs, higher crew and maintenance expenses, and higher carbon emissions.

The disclosure remedies these and other issues with current airspace planning systems by providing a secure solution for deactivating blocked airspace and allowing private operators access to data describing such deactivated blocked airspace. The disclosure allows for real-time or near real-time sharing of blocked airspace statuses as well as scheduled blocked airspace data by using a cross-domain guard or solution.

In a first aspect, a cross-domain guard can receive secure communications from classified computing systems such as military communications systems. In some implementations, secure communications can include details regarding blocked airspace managed by the operator of the classified computing systems. In some implementations, the cross-domain guard can include a set of rules for processing secure communications and for removing classified information from secure communications. As a result, the cross-domain guard can "convert" secure communications into de-classified communications. In general, the cross-domain guard can be used for all communications transmitted between classified computer systems and a central platform, discussed next.

In an implementation, the central platform can manage all aspects of de-classified blocked airspace processed through the central platform. In one implementation, a classified computing system can submit blocked airspace details (which are de-classified via the cross-domain guard) and can transmit formal requests for blocked airspace to the appropriate agency (e.g., FAA). The central platform can manage all aspects of receiving approvals, re-submitting requests, etc., and maintain its own internal database of blocked airspace. In one implementation, the central platform can also receive requests from operators for the status of a given blocked airspace. In some implementations, if the blocked airspace is still active, the central platform can query the owner of the blocked airspace (via the cross-domain guard) and receive a confirmation that the blocked airspace is still required or a release of the blocked airspace. In the event of a release of the blocked airspace, the central platform can update the appropriate agency to release the blocked airspace. The central platform can also update its own internal database of blocked airspace and return a status update to the operator. In another implementation, the central platform can receive a flight route (e.g., two or more locations) and identify all blocked airspace along the flight route. The central platform can then determine if each identified blocked airspace is still active using the aforementioned process and generate a blocked airspace report for the requesting operator to use during flight planning.

In yet another implementation, an additional process whereby a flight path is converted into individual flight steps is disclosed. In this implementation, the flight steps (which can be represented as lines or arcs) are analyzed to determine if any flight steps cross potential blocked airspace sub-regions. The potential blocked airspace sub-regions can be identified by analyzing a potentially malformed list of blocked airspace regions.

These and other aspects of the disclosure are described in further detail below.

DETAILED DESCRIPTION

Figure 1:
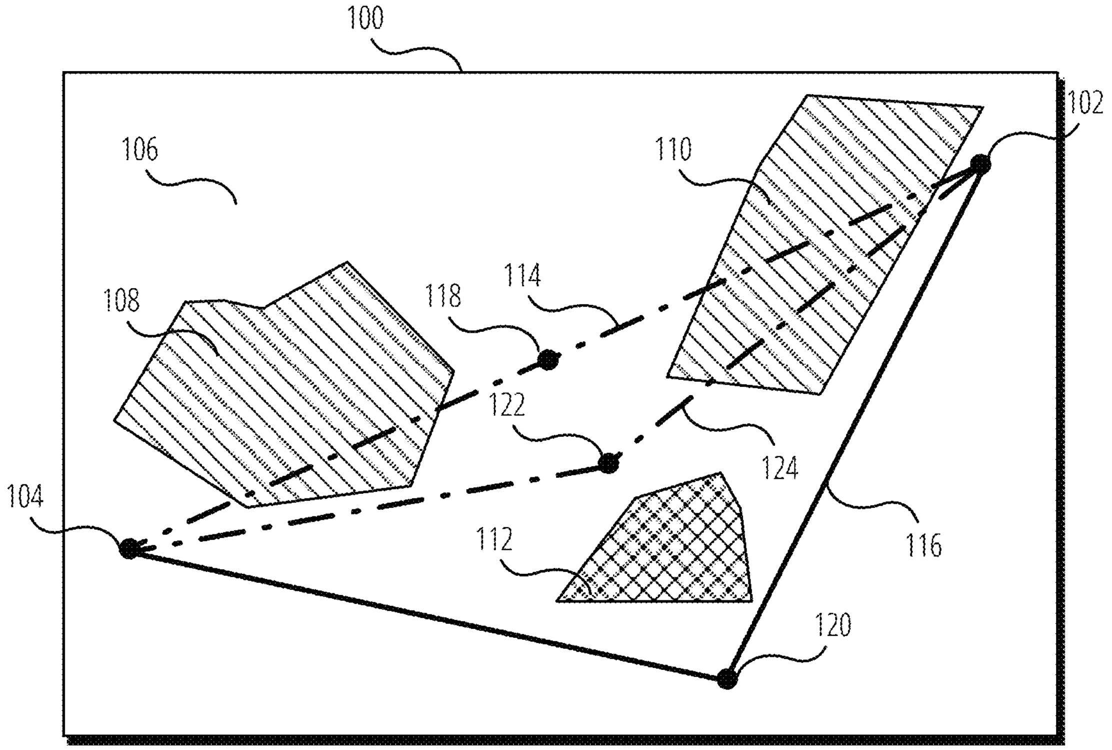
FIG. 1 is a map illustrating a region of airspace.

In some aspects, the techniques described herein relate to a method including: receiving, by a processor, blocked airspace description data; converting, by a processor, a flight path into a plurality of latitude-longitude pairs; expanding, by the processor, the blocked airspace description data into a plurality of potential blocked airspace sub-regions, each of the potential blocked airspace sub-regions including a geographical area; identifying, by the processor, a subset of the potential blocked airspace sub-regions based on comparing flight steps between respective latitude-longitude pairs and geographic areas of the potential blocked airspace sub-regions; and using, by the processor, the subset of the potential block airspace sub-regions to adjust the flight path.

In some aspects, the techniques described herein relate to a method, wherein converting a flight path into a plurality of latitude-longitude pairs includes converting a plurality of fixes in the flight path into the plurality of latitude-longitude pairs.

In some aspects, the techniques described herein relate to a method, wherein expanding the blocked airspace description data into a plurality of potential blocked airspace sub-regions includes identifying an ambiguous blocked airspace identifier in the blocked airspace description data and identifying a plurality of blocked airspace regions that encompass the ambiguous blocked airspace identifier.

In some aspects, the techniques described herein relate to a method, wherein expanding the blocked airspace description data into a plurality of potential blocked airspace sub-regions includes identifying a rule for processing an ambiguous blocked airspace identifier in the blocked airspace description data and applying the rule to the ambiguous blocked airspace identifier, the rule including a format and processing directive.

In some aspects, the techniques described herein relate to a method, wherein expanding the blocked airspace description data into a plurality of potential blocked airspace sub-regions includes identifying at least one error in the blocked airspace description data and generating a set of blocked airspace identifiers permutations based on the at least one error.

In some aspects, the techniques described herein relate to a method, wherein identifying a subset of the potential blocked airspace sub-regions based on comparing flight steps between respective latitude-longitude pairs and geographic areas of the potential blocked airspace sub-regions includes determining if a line segment of a given flight steps passes through a geographic area of a potential blocked airspace sub-region.

In some aspects, the techniques described herein relate to a method, wherein identifying a subset of the potential blocked airspace sub-regions based on comparing flight steps between respective latitude-longitude pairs and geographic areas of the potential blocked airspace sub-regions includes determining if a line segment of a given flight steps intersects at least one border of a geographic area of a potential blocked airspace sub-region.

In some aspects, the techniques described herein relate to a non-transitory computer-readable storage medium for tangibly storing computer program instructions capable of being executed by a computer processor, the computer program instructions defining steps of: receiving blocked airspace description data; converting a flight path into a plurality of latitude-longitude pairs; expanding the blocked airspace description data into a plurality of potential blocked airspace sub-regions, each of the potential blocked airspace sub-regions including a geographical area; identifying a subset of the potential blocked airspace sub-regions based on comparing flight steps between respective latitude-longitude pairs and geographic areas of the potential blocked airspace sub-regions; and using the subset of the potential block airspace sub-regions to adjust the flight path.

In some aspects, the techniques described herein relate to a non-transitory computer-readable storage medium, wherein converting a flight path into a plurality of latitude-longitude pairs includes converting a plurality of fixes in the flight path into the plurality of latitude-longitude pairs.

In some aspects, the techniques described herein relate to a non-transitory computer-readable storage medium, wherein expanding the blocked airspace description data into a plurality of potential blocked airspace sub-regions includes identifying an ambiguous blocked airspace identifier in the blocked airspace description data and identifying a plurality of blocked airspace regions that encompass the ambiguous blocked airspace identifier.

In some aspects, the techniques described herein relate to a non-transitory computer-readable storage medium, wherein expanding the blocked airspace description data into a plurality of potential blocked airspace sub-regions includes identifying a rule for processing an ambiguous blocked airspace identifier in the blocked airspace description data and applying the rule to the ambiguous blocked airspace identifier, the rule including a format and processing directive.

In some aspects, the techniques described herein relate to a non-transitory computer-readable storage medium, wherein expanding the blocked airspace description data into a plurality of potential blocked airspace sub-regions includes identifying at least one error in the blocked airspace description data and generating a set of blocked airspace identifiers permutations based on the at least one error.

In some aspects, the techniques described herein relate to a non-transitory computer-readable storage medium, wherein identifying a subset of the potential blocked airspace sub-regions based on comparing flight steps between respective latitude-longitude pairs and geographic areas of the potential blocked airspace sub-regions includes determining if a line segment of a given flight steps passes through a geographic area of a potential blocked airspace sub-region.

In some aspects, the techniques described herein relate to a non-transitory computer-readable storage medium, wherein identifying a subset of the potential blocked airspace sub-regions based on comparing flight steps between respective latitude-longitude pairs and geographic areas of the potential blocked airspace sub-regions includes determining if a line segment of a given flight steps intersects at least one border of a geographic area of a potential blocked airspace sub-region.

In some aspects, the techniques described herein relate to a device including: a processor; and a storage medium for tangibly storing thereon logic for execution by the processor, the logic including instructions for: receiving blocked airspace description data; converting a flight path into a plurality of latitude-longitude pairs; expanding the blocked airspace description data into a plurality of potential blocked airspace sub-regions, each of the potential blocked airspace sub-regions including a geographical area; identifying a subset of the potential blocked airspace sub-regions based on comparing flight steps between respective latitude-longitude pairs and geographic areas of the potential blocked airspace sub-regions; and using the subset of the potential block airspace sub-regions to adjust the flight path.

In some aspects, the techniques described herein relate to a device, wherein expanding the blocked airspace description data into a plurality of potential blocked airspace sub-regions includes identifying an ambiguous blocked airspace identifier in the blocked airspace description data and identifying a plurality of blocked airspace regions that encompass the ambiguous blocked airspace identifier.

In some aspects, the techniques described herein relate to a device, wherein expanding the blocked airspace description data into a plurality of potential blocked airspace sub-regions includes identifying a rule for processing an ambiguous blocked airspace identifier in the blocked airspace description data and applying the rule to the ambiguous blocked airspace identifier, the rule including a format and processing directive.

In some aspects, the techniques described herein relate to a device, wherein expanding the blocked airspace description data into a plurality of potential blocked airspace sub-regions includes identifying at least one error in the blocked airspace description data and generating a set of blocked airspace identifiers permutations based on the at least one error.

In some aspects, the techniques described herein relate to a device, wherein identifying a subset of the potential blocked airspace sub-regions based on comparing flight steps between respective latitude-longitude pairs and geographic areas of the potential blocked airspace sub-regions includes determining if a line segment of a given flight steps passes through a geographic area of a potential blocked airspace sub-region.

In some aspects, the techniques described herein relate to a device, wherein identifying a subset of the potential blocked airspace sub-regions based on comparing flight steps between respective latitude-longitude pairs and geographic areas of the potential blocked airspace sub-regions includes determining if a line segment of a given flight steps intersects at least one border of a geographic area of a potential blocked airspace sub-region.

FIG. 1 is a map illustrating a region of airspace.

As illustrated, a region 100 can include unrestricted airspace 106 and a plurality of blocked airspaces including blocked airspace 108, blocked airspace 110, and blocked airspace 112. In general, a blocked airspace refers to a region of airspace (defined, for example, by coordinates) that imposes restriction on aircraft within the region of airspace (including blocking travel within the region of airspace). In general, the blocked airspaces can include special user airspace (SUA) or other types of special activity airspace (SAA), such as restricted airspaces, prohibited airspaces, military operations areas (MOAs), warning areas, alert areas, temporary flight restrictions (TFR), national security areas, Air Traffic Control Assigned Airspace (ATCAAs), and controlled firing areas. While the description emphasizes SUAs, the disclosure is not limited as such, and any type of airspace reservation can be used in the following description.

In general, a blocked airspace can be created by a utilizing organization (UO) contracting with an airspace control agency (e.g., the FAA in the United States) to define a region of blocked airspace and the rationales for restricting access to the region. A UO can then both activate, adjust, and deactivate the blocked airspace region via, for example, issuing Notice to Air Mission (NOTAM) (also referred to as Notice to Airmen) communications. In some implementations, after creating a blocked airspace region, a UO can temporarily deactivate and then re-activate the blocked airspace region. In general, a UO will transmit a notification to the airspace control agency when activating and deactivating (and possibly releasing) a blocked airspace region.

Flight operators (e.g., commercial airlines, general aviation) are normally required to provide flight plans before operating aircraft. These flights plans include a flight path or route that defines the route of the aircraft during the flight. In general, a flight path is represented as a series of locations and/or operating characteristics of an aircraft such as route designators, significant points (Navaids, named fixes, etc.), change of speed or level, change of flight rules, and cruise climbs.

In the illustrated example, a flight operator is planning a flight path between a starting point (KSPT 102) and an ending point (KEPT 104). During planning, the operator inspects the unrestricted airspace 106 to identify potentially blocked airspaces between KSPT 102 and KEPT 104, identifying blocked airspace 108, blocked airspace 110, and blocked airspace 112. In existing systems, the flight operator may only obtain the presence of the blocked airspace and may not have an up-to-date understanding of whether the blocked airspace is needed. As such, the flight operator will plan the flight path to avoid these regions. Specifically, flight path 116, via (for example) fix (ALLFA 120), may be selected to avoid the blocked airspaces. In contrast, the most direct path from KSPT 102 and KEPT 104 may be flight path 114 (through, for example, fix BETTA 118). As such, flight path 116 resulting from the blocked airspace is necessary longer than flight path 114.

In the following implementations, a dynamic blocked airspace system is described, which provides up-to-date blocked airspace details allowing for more optimal flight planning. For example, in a first scenario, blocked airspace 110 may be deactivated by the UO. In this scenario, flight operator (e.g., via flight planning software) can be informed of the deactivation of blocked airspace 110. As such, the flight planning software may be able to generate flight path 124 (via, for example, fix GAMMA 122), which significantly reduces the total distances between KSPT 102 and KEPT 104. As a second example, if both blocked airspace 108 and blocked airspace 110 are deactivated, the flight operator can use the optimal route of flight path 114 when planning the route.

Figure 2:
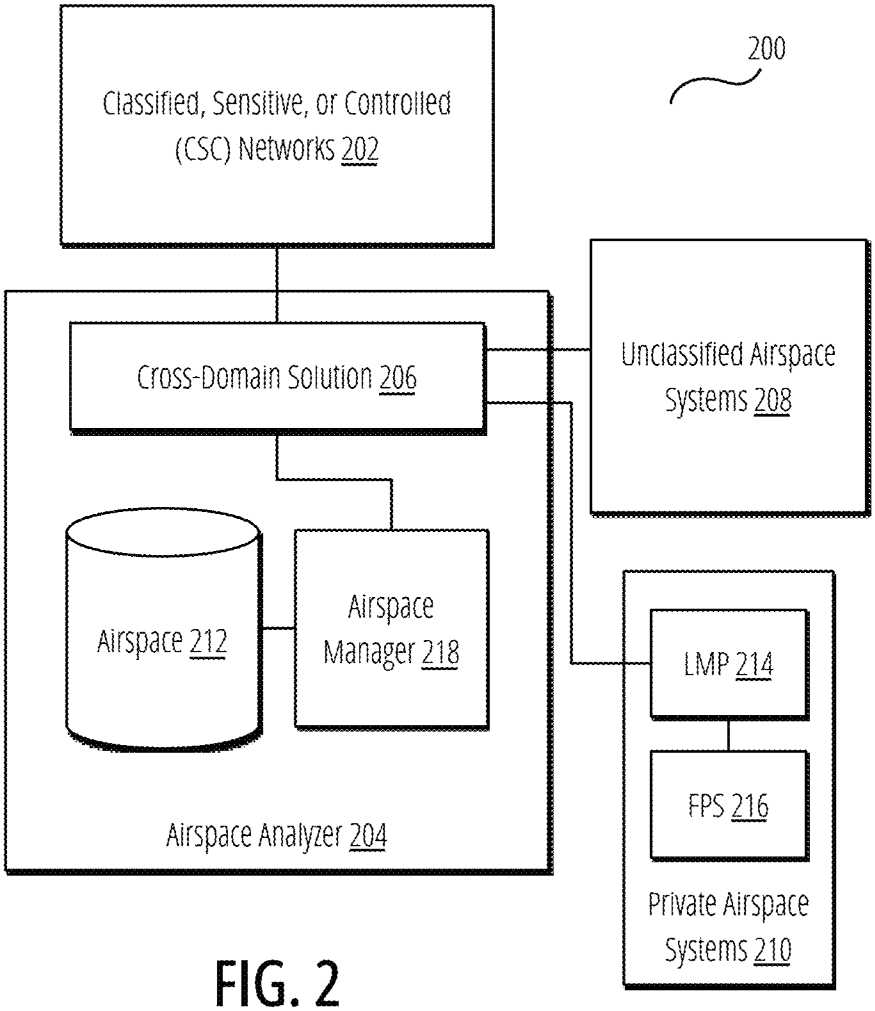
FIG. 2 is a block diagram of a system for managing blocked airspace.

FIG. 2 is a block diagram of a system for managing blocked airspace.

In one implementation, system 200 includes an airspace analyzer 204 that communicates with classified, secured, or controlled (CSC) networks 202, unclassified airspace systems 208, and private airspace systems 210. In one implementation, the CSC networks 202 can comprise military or other secure communications networks that generally are inaccessible by the public. Specific implementations of CSC networks 202 are not limiting, and any computer network handling classified, sensitive, or controlled information may be used.

In one implementation, the CSC networks 202 communicate with the airspace analyzer 204 via a cross-domain solution 206. In one implementation, the cross-domain solution 206 comprises an integrated information assurance system composed of specialized software and/or hardware that provides a controlled interface to manually or automatically enable and/or restrict the access or transfer of information between two or more security domains based on a predetermined security policy.

In some implementations, the cross-domain solution 206 provides technical security controls for bi-directional communication between security domains where a security domain is classified and/or unclassified. The cross-domain solution 206 reduces security risks and provides a high assurance that technical security controls are enforced. In one implementation, a plugin (e.g., LMP) in the CSC networks 202 can use a secure protocol such as Secure Copy Protocol (SCP), Secure File Transfer Protocol (SFTP), or eXtensible Markup Language (XML) Schema Validation to build and transmit messages from CSC networks 202 to the cross-domain solution 206. The LMP installed in the CSC networks 202 can also provide the technical capability to provide for a network protocol break between the security domains.

In some implementations, the predetermined security policy can remove classified or otherwise sensitive information from communications received from CSC networks 202. The cross-domain solution 206 can also include policies to restrict data flowing from airspace analyzer 204 to cross-domain solution 206, to prevent malicious data from entering the CSC networks 202. In some implementations, the airspace analyzer 204 can include a single cross-domain solution device. However, in other implementations, the airspace analyzer 204 can include multiple cross-domain solution devices. For example, the airspace analyzer 204 can include a cross-domain solution for each different classified network. In an alternative implementation, the cross-domain solution device can be physically installed within the CSC networks 202, and multiple such cross-domain solution devices can be installed for each classified network.

Various examples of communications to and from CSC networks 202 and airspace analyzer 204 are described briefly herein and in more detail in the following FIGS. 3 through 5. In a first example, the CSC networks 202 can issue requests to block new regions (or update existing regions) of airspace to the airspace analyzer 204. In some implementations, the cross-domain solution 206 is configured to analyze the requests to remove any potential classified data included in the request (e.g., details of military operations, etc.) according to an underlying policy. In a second example, the airspace analyzer 204 can issue a request for an updated status of a blocked airspace region to CSC networks 202 (via cross-domain solution 206). In response, the CSC networks 202 can issue an updated status of the blocked airspace region to airspace analyzer 204 via the cross-domain solution 206 (which removes any classified information). Notably, the use of cross-domain solution 206 allows for bidirectional communication regarding any airspace data between CSC networks 202 and airspace analyzer 204, examples of which are described herein.

The airspace analyzer 204 includes an airspace manager 218 communicatively coupled to the cross-domain solution 206 and an airspace database 212. In one implementation, the airspace manager 218 is configured to manage blocked airspace statuses for operations of the airspace analyzer 204, as will be discussed. In some implementations, the airspace database 212 stores the status of some or all blocked airspaces in the NAS. In some implementations, the airspace database 212 stores a minimal representation of blocked airspace. For example, the airspace database 212 can store a hash and a unique identifier of the blocked airspace. Then, if the status of the blocked airspace changes, a second hash can be computed and compared to the existing hash to manage changes. In some implementations, unclassified airspace systems 208 stores a canonical listing of all blocked airspaces. In one implementation, the unclassified airspace systems 208 can comprise the FAA System Wide Information Management (SWIM), or similar international, platform. In one implementation, the airspace manager 218 can query the unclassified airspace systems 208 to obtain the status of an existing blocked airspace region. The airspace manager 218 can then generate hashes from the returned status data. In some implementations, the airspace manager 218 can handle requests from CSC networks 202 for new blocked airspace regions and can transmit the requests to unclassified airspace systems 208 and await confirmation that the unclassified airspace systems 208 have created the blocked airspace regions. In contrast, in existing airspace management systems, the reservation of blocked airspace is a manual process requiring necessary agreements and paperwork. The airspace manager 218 obviates this process by relying on the unclassified airspace systems 208 which provide data access for airspace reservations. The use of cross-domain solution 206 allows for classified systems to participate in the process without sacrificing data security. For requests for blocked airspace arising from CSC networks 202 (via airspace analyzer 204), the airspace analyzer 204 will await confirmation of the reservation from unclassified airspace systems 208 before updating the airspace database 212.

As illustrated, private airspace systems 210 communicate with airspace analyzer 204 via the cross-domain solution 206, thus further ensuring the shielding of classified data from CSC networks 202. In some implementations, the private airspace systems 210 can include systems operated by non-governmental entities (e.g., airlines, private space operators, etc.). For example, flight planning software 216 can be used by such entities to generate flight plans for submission to ATC (e.g., via unclassified airspace systems 208). As illustrated, the flight planning software 216 can communicate with the airspace analyzer 204 via a last-mile plugin, LMP 214. In one implementation, the LMP 214 can comprise a command line interface, graphical user interface, library, or other type of software that allows the flight planning software 216 to communicate with LMP 214. Details of the LMP 214 are provided further herein. In brief, the LMP 214 allows the FPS 216 to query for the status of one or more blocked airspace regions when planning routes. In response, the airspace manager 218 can get up-to-date blocked airspace data from airspace database 212 and unclassified airspace systems 208 and generate reports of whether blocked airspace is activated or deactivated during the time required by the flight plan. As will be discussed, in some implementations, the airspace manager 218 can also facilitate querying the CSC networks 202 on the status of an activated blocked airspace region and, in some scenarios, can allow the CSC networks 202 to deactivate blocked airspace. In such a scenario, the airspace manager 218 can forward the deactivation to unclassified airspace systems 208 and update the airspace database 212, resulting in a dynamically "freed" region of blocked airspace.

Figure 3:
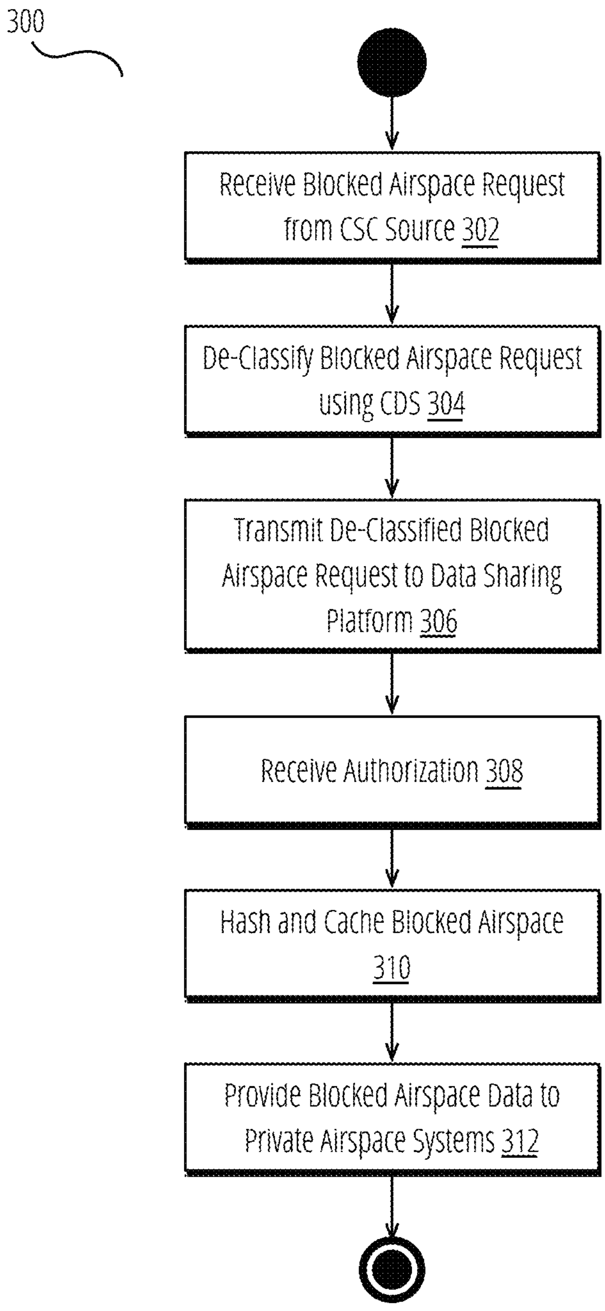
FIG. 3 is a flow diagram illustrating a method for registering a blocked airspace region.

FIG. 3 is a flow diagram illustrating a method for registering a blocked airspace region.

In step 302, method 300 can include receiving a blocked airspace request from a classified source (e.g., CSC networks 202). In some implementations, a classified source can utilize an LMP to initiate and send a blocked airspace request from a classified network to a cross-domain solution (e.g., cross-domain solution 206). In some implementations, the blocked airspace request can comprise an XML request, although the specific format is not limiting. Although FIG. 3 is described with respect to a request issued by a classified source, method 300 can be applied to any entity (e.g., airline, space operator, etc.) and references to classified sources should be construed as limiting. In some implementations, the block airspace request can include the following fields illustrated in Tables 1, 2, and 3:

TABLE 1

| Param Contents | Type | Comment |
|---|---|---|
| Schedule ID | Number | Unique schedule identifier |
| Airspace ID | Number | Airspace identifier |
| Schedule Status | Character | One character (See Table 2) |
| Airspace Type | Character | One character (See Table 3) |
| Airspace Name | Character | <=30 characters |
| Start Time (UTC) | Character | 15 characters (YYYY/MMDD HH:MI) |
| End Time (UTC) | Character | 15 characters (YYYY/MMDD HH:MI) |
| Low Alt / Entry Point | Number or Character | Low Altitude is 100's of feet and three characters. Entry Point is 1-3 characters. |
| High Alt / Exit Point | Number or Character | High Altitude is 100's of feet and three characters. Exit Point is 1-3 characters. |
| Separation Rule | Character | A: Aircraft Rule O: Other Rule |

TABLE 2

| Airspace Type | Comments |
|---|---|
| W | Warning Area |
| R | Restricted Area |
| M | Military Operations Area |
| P | Prohibited Area |
| L | Alert Area |
| A | ATCAA |
| I | Instrument Route |
| V | Visual Route |
| S | Slow Route |
| B | Aerial Refueling Route / Anchor |
| O | Orbit / Other |

TABLE 3

| Schedule Status | Comment |
|---|---|
| P | Pending Approval |
| W | Waiting to Start |
| H | "Hot" / Activated for Use |

In step 304, method 300 can include de-classifying the blocked airspace request using a cross-domain solution.

In one implementation, method 300 can include applying one more predefined security policies to the blocked airspace request using a cross-domain solution, as described previously. In some implementations, step 304 can include filtering the received blocked airspace request to remove any classified data included therein. After filtering any classified information, step 304 can also include generating an XML or similarly formatted message that represents the blocked airspace request. Example fields or data elements in such a message depicted in the following Table 4:

TABLE 4

| Field Name | Type | Size (B) | Sample |
|---|---|---|---|
| SUA-Number | Char | 64 | P-40 |
| Horizontal Dimensions | Char | 256 | Latitude, Longitude, Radius |
| Altitude (Pilot Speak) | Char | 256 | TO BUT NOT INCL 5000 (UNDERLIES R-4009) |
| Altitude | Char | 128 | 0, <5000 (0, <=5000-Surface to and include 5000) |
| Time of Use | Int | 32 | CONTINUOUS (0000Z Start to End 0000Z) |
| Controlling Agency / Contact Facility | Char | 256 | NO A/G (Camp David probably the NAVY) |
| Frequencies | Int | 32 | (None listed) |
| SUA-Telephone | Char | 32 | 1 202-555-1234 |
| SUA-Email | Char | 128 | <SUA-Number-Contact Facility> @faa.gov, spacex.com, etc.> |
| Data Flow ID | Char | 256 | P-40 |
| Data Flow Server IN | Char | 256 | IN.server.SWIM.FAA.GOV (response from) |
| Data Flow Server OUT | Char | 256 | OUT.server.SWIM.FAA.GOV (request to) |
| Requestor ID | Char | 64 | user@example.com |
| Requestor E-mail | Char | 32 | user@example.com |
| Requestor Phone | Char | 32 | 1 800-555-1234 |
| Requestor Phone SMS Capable | Bool | 1 | T |
| Request Time | Time | | |

In step 306, method 300 can include transmitting declassified blocked airspace details to a data sharing platform (e.g., unclassified airspace systems 208). In some implementations, the data sharing platform can expose an endpoint or facility for initiating blocked airspace requests. For example, the data sharing platform can define a specific uniform resource locator for requesting blocked airspace. The specific details of the data sharing platform are not limiting and any type of network system that can receive such messages can be used.

In step 308, method 300 can include receiving authorization from the data sharing platform. As illustrated in Table 5 below, the data sharing platform can be assigned an identifier (Request ID) to the blocked airspace request and include a Request Approved field that indicates whether the request was approved or denied and a conditions field that specifies any conditions on the approval.

TABLE 5

| Field Name | Type | Size (B) | Sample |
|---|---|---|---|
| Response Time | Time | | |
| Request Approved | Char | 16 | Approved / Denied |
| Request Approval Conditions | Char | 256 | Approval is void if not able to clear by 1 hour ofrequested time |
| Request ID | Char | 128 | P40AALSUAYYYYMMDDHHMMSS000 |

In step 310, method 300 can include hashing and caching data representing the blocked airspace. Once method 300 receives an approval (or denial), method 300 stores the approval status of the airspace. In some implementations, method 300 can include storing less than all of the data in Tables 4 and 5 when storing the request. For example, in some implementations, method 300 can store an identifier (e.g., SUA-ID) of the blocked airspace and a hash value. In some implementations, the hash value can be computed using a one-way hash function such as a SHA-256 or MD5 function. In some implementations, the hash value can be computed using some of all of the field values of Tables 4 and 5 as the input data. As will be discussed, the use of hash can allow for a large number of blocked airspaces to be efficiently stored and further enables easier comparison to detect changes in the status of the blocked airspace.

In step 312, method 300 can include providing blocked airspace data to one or more private airspace systems (e.g., private airspace systems 210). As will be discussed in more detail below, method 300 can continuously monitor airspace using method 300 (as well as method 400 and method 500) and can generate reports of blocked airspace along a flight path. In some implementations, private airspace systems (e.g., airline flight planning systems) can issue requests to the system to receive statuses of blocked airspace regions along a flight path.

Figure 4:
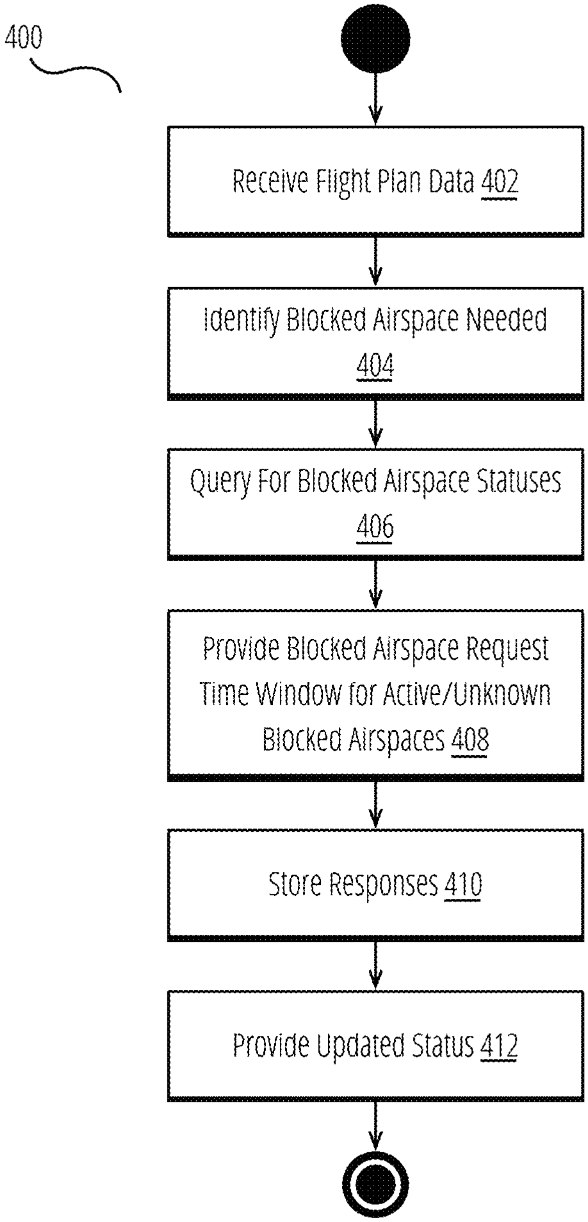
FIG. 4 is a flow diagram illustrating a method for identifying regions of blocked airspace along a flight path.

FIG. 4 is a flow diagram illustrating a method for identifying regions of blocked airspace along a flight path.

In step 402, method 400 can include receiving flight plan data.

In some implementations, method 400 can receive the flight plan data from an LMP installed on an airline system or similar type of private aviation system. In some implementations, an aviation system can file an operational flight plan approximately six hours prior to departure. Planning software can store the operational flight plan data elements in the flight planning software's data store. In some implementations, an LMP can query the airline's flight planning software data store, identify a new flight plan.

The flight plan data can include various fields, such as those listed in Table 6:

TABLE 6

| Field Name | Type |
|---|---|
| Aircraft ID | Char |
| Flight Rule | Char |
| Flight Type | Char |
| No. of Aircraft | Char |
| Aircraft Type | Char |
| Wake Turbulance | Char |
| Aircraft Equipment | Char |
| Surveillance Equipment | Char |
| Departure Location | Char |
| Departure Date | Char |
| Departure Time | Char |
| Departure Time Zone | Char |
| Cruising Speed | Char |
| Level | Char |
| Route of Flight | Char |
| Destination Location | Char |
| Est. Elapsed Time | Char |
| Other Information (optional) | Char |
| Alternate Airport 1 | Char |
| Alternate Airport 2 | Char |
| Emergency Equipment | |
| Emergency Radio | Char |
| Survival Equipment | Char |
| Dinghies | Char |
| Supplemental Equipment | |
| Aircraft Color & Markings | Char |
| Fuel Endurance | Char |
| Persons on Board | Char |
| Pilot Information | |
| Supplemental Remarks (optional) | Char |
| Pilot-in-Command | Char |
| Pilot Contact Information | Char |

In step 404, method 400 can include identifying any blocked airspace needed based on the flight plan. In one implementation, an LMP can analyze the flight plan's route and determine the blocked airspace traversed by the flight route. In some implementations, the LMP can use the data sharing platform to obtain default data on blocked airspace (e.g., static data regarding blocked airspace regions). In other implementations, the LMP can query airspace analyzer 204 to obtain the list of blocked airspace. In some implementations, the LMP can retrieve all data regarding the blocked airspace (e.g., all fields in Tables 4 and 5).

In some implementations, method 400 can include computing both the locations of blocked airspace along the route of a flight path based on the "Route of Flight" field as well as the departure details (e.g., Departure Location, Departure Date, Time and Time Zone), altitude and speed data (e.g., Cruising Speed, Level, Est. Elapsed Time) and arrival details (e.g., Destination Location). In some implementations, method 300 can use the Route of Flight to first compute a candidate set of blocked airspaces along the route of flight. Next, method 300 can use the altitude and speed data to filter those blocked airspaces that are not impacted by the flight path (e.g., blocked airspaces below the cruising altitude by a fixed threshold).

Figure 6:
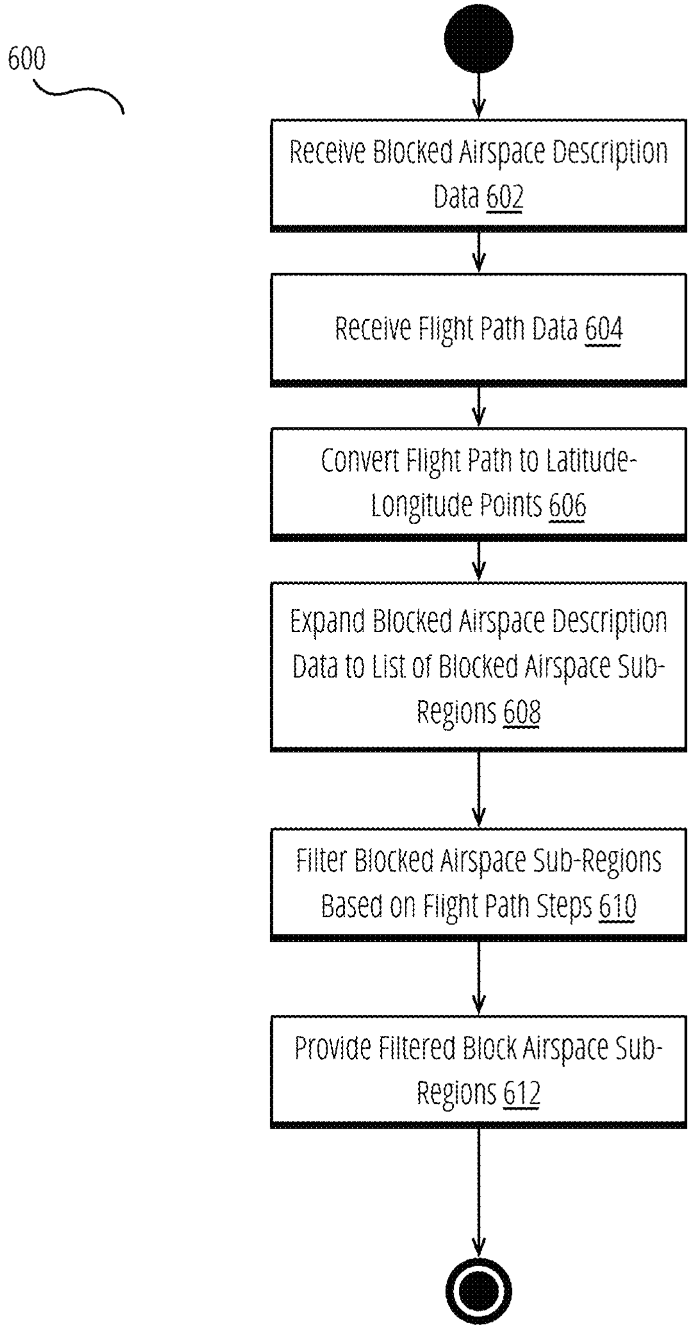
FIG. 6 is a flow diagram illustrating a method for resolving SUA reservations and adjusting a flight path based on the resolved SUAs.

In some implementations, step 404 can additionally include method 600 described in FIG. 6. Specifically, step 404 can include a step of filtering blocked airspaces to identify a narrower range of blocked airspace based on a given flight path. As such, in some implementations In step 406, method 400 can include querying for the current statuses of the blocked airspaces identified in step 404. In one implementation, step 406 can include checking the status of the identified blocked airspaces within plus or minus one hour of estimated time of traversing the airspace, as determined based on the cruising speed, estimated elapsed time, etc. In some implementations, the current statuses can be obtained by querying the data sharing platform (as described in FIG. 3) and can include some or all of the elements depicted in Tables 4 and 5.

In step 408, method 400 can include providing blocked airspace request time windows for any active or unknown blocked airspaces.

In some implementations, if a given blocked airspace is available method 400 can include sending a notification (e.g., e-mail, text, or pop-up message) to the flight dispatch personnel that generated the flight plan. Alternatively, in some implementations, this can be included in the response in step 412. In some implementations, this notification can provide the flight dispatcher with the actionable intelligence that is needed to plan the flight through the unused/deactivated blocked airspace resulting in time savings due to a more direct route.

By contrast, in step 408, if method 400 identifies that a blocked airspace is not available method 400 will generate a request (e.g., e-mail, text, XML SOAP, JavaScript Object Notation) to the UO via a cross-domain solution. The generated request is intended to reach the UO point of contact (POC) based on the corresponding POC details associated with the blocked airspace. The controlling UO can receive an automated electronic message containing a request to use the blocked airspace at a specified time (computed by the LMP using the data of Table 6). In some implementations, step 408 can include recording metric data for the request.

In one implementation, the UO POC can process the electronic message in a timely manner (e.g., 180 minutes) and transmit an automated electronic response into the appropriate government system (e.g., SAMS or MADE). The electronic automated response will contain the final disposition of release or deactivation of the airspace. Alternatively, the response can include the denial of the request which will maintain the blocked airspace as active. In one implementation, method 400 will then query the data sharing platform (e.g., FAA SWIM) and obtain the final status of UO's airspace status.

If the blocked airspace remains unusable (based on the response from the data sharing platform), method 400 can store the time of status and request submission information in step 410. By contrast, if the blocked airspace is deactivated, method 400 can store (step 410) the time of status and notify (Step 412) airline flight dispatch of the blocked airspace status change which will provide the airline dispatcher with an opportunity to update flight plan route to utilize a more direct route that has the potential to reduce the time needed to complete the route which will result in lower block times.

Since airlines need sufficient time to prepare the operational flight plans. The dynamic nature of an aircraft's weight and balance along with the aircrafts fuel load is critical. Once the fuel is loaded onto the aircraft changes to cargo or number of passengers is limited by the fuel burn to the destination and required fuel reserves. This is one of the reasons that method 400 is effective in lowering block times. The cross-domain bi-directional communication between government and commercial operators provides predictable and actionable near real time intelligence with sufficient time for dispatchers to update routes prior to departure time. Dispatchers having sufficient time prior to departure is critical in the selection of the flight plan route.

Figure 5:
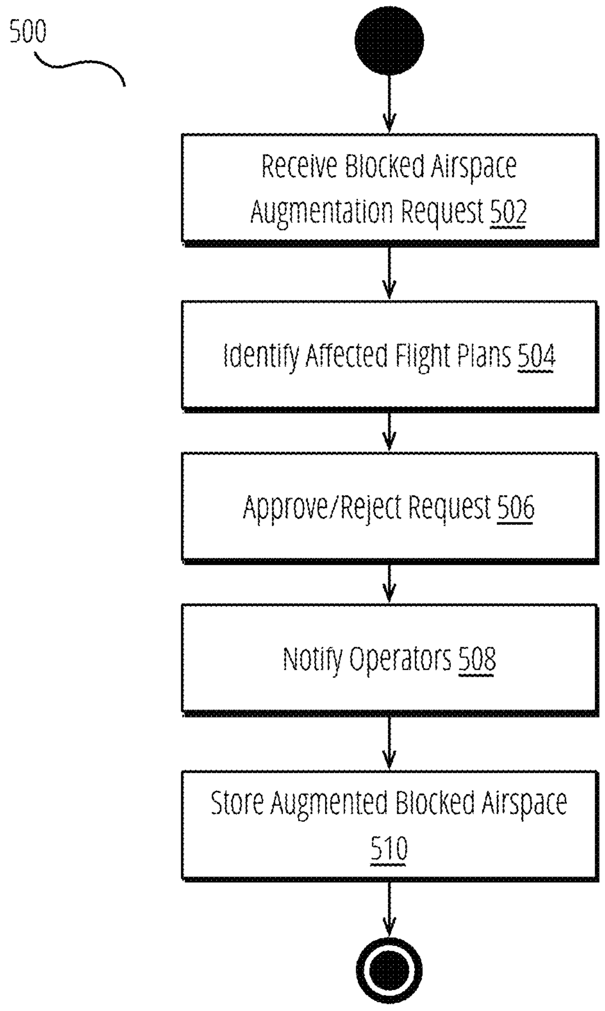
FIG. 5 is a flow diagram illustrating a method for updating a region of blocked airspace.

FIG. 5 is a flow diagram illustrating a method for updating a region of blocked airspace.

In step 502, method 500 can include receiving a blocked airspace augmentation request.

In some implementations, a need can arise for an ad-hoc blocked airspace augmentation request by, for example, a Department of Defense element, other government agency, or one of the many commercial NAS operators for special activity airspace. Generally, this ad-hoc request is to expand or supplement the periodically scheduled blocked airspace facilities times and geographic areas.

In some implementations, method 500 can include providing a user interface (e.g., via a website, mobile application, command line utility, etc.) for an end user to request augmentation of an existing blocked airspace. In response, method 500 can include submitting the appropriate message to the data sharing platform (e.g., FAA SWIM) to request the augmentation. In one implementation, the cross-domain solution can receive this message and transmit the messages to the classified systems which receive the message. A plugin (e.g., LMP) in the classified systems generates a notification to the UO about the ad hoc request.

In step 504, method 500 can include identifying any affected flight plans.

Simultaneously with the above, method 500 can include identifying any received flight plans that are still active that will be affected by the blocked airspace augmentation. In some implementations, method 500 can query a database that stores received flight plans and corresponding identifiers (e.g., SUA-IDs) of blocked airspaces. In other implementations, the database can map each SUA-ID to a list of flight plans.

In some implementations, method 500 can include transmitting notifications to all entities that submitted flight plans that are affected by the reservation request. Each affected entity can be provided an opportunity (e.g., in step 506) to voice the impact on commercial operations such as the season, major event, number flights, number passengers, number of additional nautical miles flown. In some implementations, method 500 can include receiving votes (or other data) from each of the entities that indicate their approval or denial of the request. In some implementations, method 500 can employ a consensus protocol to approve or deny ad-hoc request. In some implementations, one of the entities can include a government airspace agency (e.g., the FAA). In some implementations, if a consensus is reached (e.g., majority rule), step 506 can include submitting a request to the appropriate data sharing platform (e.g., FAA SWIM) and receiving a response. In some implementations, the response received from the data sharing platform can include a binary response (e.g., approved or rejected). In other implementations, the response received from the data sharing platform can include a non-binary response (e.g., as depicted in Table 3).

In step 506, method 500 can include notifying the operators having affected flight plans of the change. In some implementations, step 506 can include generating e-mail, XML SOAP message, JSON message, or other formatted message and transmitting the message to the flight planning systems of the affected operators. In some implementations, these flight planning systems can then adjust flight paths based on the updated blocked airspace augmentation. In some implementations, if the response received from the data sharing platform is a binary response (e.g., approved or rejected), step 506 can include transmitting the response to the operators having affected flight plans. Alternatively, if the response received from the data sharing platform, is non-binary, step 506 can include performing further processing on the non-binary response to return a binary response to the operators having affected flight plans. For example, in step 506, method 500 can wait for a final status from the data sharing platform if the response received from the data sharing platform includes interim statuses (e.g., "pending," "waiting to start," etc.). Thus, in some implementations, method 500 may only return a status to the operator when the response received from the data sharing platform reaches a final state.

In step 510, method 500 can include storing the augmented blocked airspace. As with step 310, method 500 can hash and store the augmented blocked airspace in a similar manner to maintain an updated record of the status of a given blocked airspace region.

FIG. 6 is a flow diagram illustrating a method for resolving SUA reservations and adjusting a flight path based on the resolved SUAs.

In step 602, method 600 can include receiving blocked airspace description data.

In one implementation, method 600 can receive the blocked airspace description data from a data sharing platform (e.g., FAA SWIM). For example, method 600 can query such a data sharing platform to identify all potential block airspace designators for a given flight path. Details of accessing such blocked airspace description data are provided in the description of step 404 and are not repeated herein.

In some implementations, the blocked airspace description data can include textual data describing the specific blocked airspace (e.g., SUAs). For example, the blocked airspace description data can include a string including SUA identifiers (e.g., "4807A/C") or similar types of designators. As will be discussed, these designators are frequently (if not exclusively) supplied by UOs such as military or governmental bodies. Frequently, however, the designators are ill- or under-defined (or generally malformed). For example, may UOs utilize shorthand notations that are understandable by military or other government personnel but are not processible by software or at times readable by lay persons given their use of shorthand. Additionally, some UOs can omit essential information, relying on the common knowledge of aviators and other personnel familiar with the specific UO. For example, a military base may specify an SUA identifier ("4807") with no sub-region identifier (e.g., A, B, C, etc.), and personnel and others may be aware that such a UO only truly designates one sub-region unless explicitly designating other sub-regions. As another example, a UO may specify a blocked airspace of "4807A/C," however, this designator is ambiguous as to whether the blocked airspace includes 4807A, 4807B, and 4807C or includes only 4807A and 4807C.

In these examples and many others, the true blocked airspace designators are not represented in the blocked airspace description. As such, flight planning computer systems over include blocked airspace (e.g., include all sub-regions) to avoid any risk of entering blocked airspace. Thus, in the last example, without conflict resolution, a flight planning system would consider the airspace represented by 4807A, 4807B, and 4807C to be blocked airspace, despite only 4807B actually representing usable airspace.

In step 604, method 600 can include receiving flight plan data.

In some implementations, method 400 can receive the flight plan data from an LMP installed on an airline system or similar type of private aviation system. In some implementations, an aviation system can file an operational flight plan approximately six hours prior to departure, or some other time period prior to departure. Planning software can store the operational flight plan data elements in the flight planning software's data store. In some implementations, an LMP can query the airline's flight planning software data store and identify a new flight plan. The flight plan data can include various fields, such as those listed in Table 6, described previously.

In various implementations, the route of flight field of the flight plan may include a series of waypoints, fixes, or other indicators outlining the route of the flight. Such waypoints generally take the form of multi-character identifiers of established points in a geographic region. In general, such representations are suitable for pilots and other aviation personnel; however, they are limited in use for computerized systems. In some instances, these mappings can be supplied by governmental or other aviation organizations and comprise standardized latitude and longitude points associated with alphanumeric fixes or waypoints. Alternatively, or in conjunction with the foregoing, a private database of such latitude and longitude points can be maintained.

As such, in step 606, method 600 can include converting the individual flight path route into a plurality of latitude and longitude points.

In some embodiments, the latitude and longitude points include at least two latitude and longitude points (e.g., a start and end point). However, the latitude and longitude points often (and usually) include multiple latitude-longitude points. In an implementation, method 600 can maintain a database of latitude and longitude points associated with given waypoints.

In the foregoing method 600, the universe of potentially blocked airspaces can be reduced significantly. As such, in downstream processes (e.g., method 400), only a limited number of actual blocked airspaces need to be queried to plan a flight. As such, method 600 dramatically reduces the processing time and network communications to plan a flight path using the automated systems above. Further, since no human intervention is needed, method 600 can achieve the aforementioned performance improvements autonomously and without the need for human knowledge and experience.

In step 608, method 600 can include expanding the blocked airspace description data into a list of potential blocked airspace sub-regions.

In one implementation, step 608 can include analyzing the provided blocked airspace descriptors or identifiers and identifying an inclusive list of potential identifiers that match the identifiers. For example, the ambiguous identifier "4807A/C" can be expanded to 4807A, 4807B, and 4807C. As another more inclusive example, the same ambiguous identifier can be expanded to 4807N, where N comprises all possible valid values that correspond to actual blocked airspace identifiers. As discussed above, such an approach is generally an over-inclusive one that expands the universe of potential blocked airspaces. As will be discussed, further processing will limit the universe of potential blocked airspaces. Notably, however, in embodiments, since this process can be computed solely using text processing algorithms, the computational complexity is low, and network latency is likewise low or non-existent.

Alternatively, or in conjunction with the foregoing, step 608 can include using a list of known ambiguities to resolve the blocked airspace identifiers. As discussed above, some blocked airspace identifiers are subject to standard "shorthand," formats, or other ambiguities. Thus, in some implementations, method 600 can store a rules list of such shorthand, formats, and other ambiguities. Upon detecting a blocked airspace identifier that has a known shorthand, known format, or ambiguity, step 608 can include applying the rule and identifying a list of potential blocked airspace identifiers. For example, the ambiguous identifier "4807A/C" may match rule that states any blocked airspace identifier having a format including "4807" and a slash ("/") should only include the sub-regions (e.g., A and C) surrounding the slash, and nothing in between (e.g., B). Such a transformation of an airspace identifier to one or more other airspace identifiers is referred to as a processing directive. As such, step 608 can identifier sub-regions 4807A and 4807C as the potential blocked airspace regions. In some implementations, the use of a rules list may be optional or may be limited to only well-known rules to avoid missing airspace.

Alternatively, or in conjunction with the foregoing, step 608 can include detecting typographic errors or other malformations in the blocked airspace identifiers. For example, a blocked airspace identifier may always include four numbers. If a blocked airspace identifier is detected having three numbers, step 608 can detect such an error and generate a list of all possible permutations of four-digit numbers that maintain the order of the three digits (inserting numbers 0-9 in each missing place). Thus, the identifier "487" can be "expanded" to "1487, 2487, 3487, . . . 4087, 4187, . . . 4807, 4817, . . . 4870, 4871, . . . ," etc. Such an approach is over-inclusive but accounts for such typographic errors. As will be discussed, this over-inclusive approach can be reduced in later steps.

In step 610, method 600 can include determining which of the identifier blocked airspace identifiers include a step in the flight path.

As discussed above, a flight path can be converted into a series of latitude-longitude pairs. As such, flight steps of a flight path can be computed as straight or curved (e.g., great circle) lines between such latitude-longitude pairs. Further, each of the identified blocked airspaces will generally include a geographic description that effectively defines an area of airspace (generally in the form of a listing of latitude-longitude points as part of a "boundaries" property of the blocked airspace). Generally, a blocked airspace area is referred to a polygonal area, however the areas are not limited as such.

Given these two types of data, step 610 can include iterating through each flight step and determining if any point along the line representing the flight step overlaps with a point in the polygonal area of the blocked airspace. For example, in one implementation, step 608 can convert the boundaries of the blocked airspace into individual line segments defining the perimeter and can determine if a flight step line intersects with any of the individual line segments. Certainly, other geometric or other techniques can be used to determine if a given line exists within a geographic region and the disclosure is not limited as such.

As stated, in step 610, method 600 iterates through each step of the flight path and identifies any blocked airspaces that intersect with the flight path. As a result, step 610 generates a list of potential blocked airspaces. This list can generally be relatively small, and certainly smaller than an overinclusive list of blocked airspaces generated due to malformed blocked airspace identifiers.

Finally, in step 612, method 600 can provide the intersecting blocked airspace identifiers back to a downstream process. For example, method 600 can be executed as part of step 404 of method 400. Thus, in step 406, method 400 can only issue queries to the limited number of blocked airspaces identified using method 600. As mentioned above, time and computational complexity of method 400 can be reduced by using method 600 to limit the total number of blocked airspaces that need to be queried.

Figure 7:
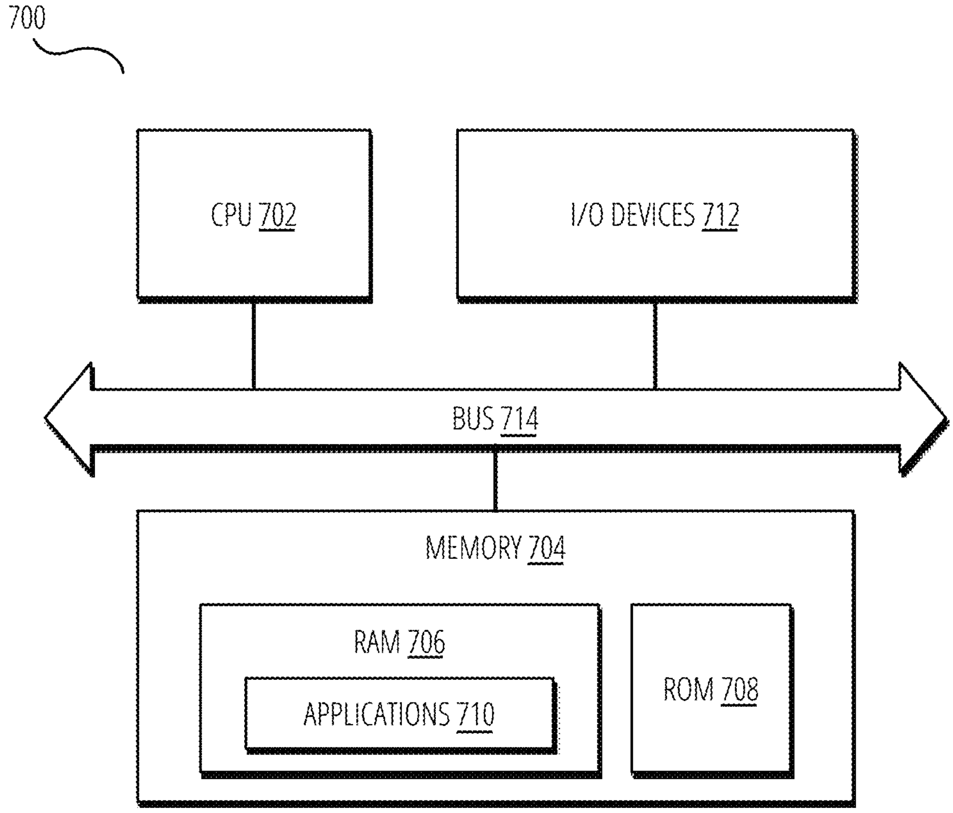
FIG. 7 is a block diagram of a computing device.

In some implementations, the foregoing steps of method 600 may be executed by a computer processor such as that depicted in FIG. 7. In other implementations, the foregoing steps of method 600 may be implemented as computer program instructions capable of being executed by a computer processor that are stored on a non-transitory computer readable storage medium.

FIG. 7 is a block diagram of a computing device.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some implementations, the CPU 702 may comprise a general-purpose CPU. The CPU 702 may comprise a single-core or multiple-core CPU. The CPU 702 may comprise a system-on-a-chip (SoC) or a similar embedded system. In some implementations, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one implementation, the bus 714 may comprise a Peripheral Component Interconnect Express (PCIe) bus. In some implementations, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some implementations, the software or programs implementing the above-described methods can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one implementation, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, by one or more processors, blocked airspace description data;

converting, by the one or more processors, a flight path into a plurality of latitude-longitude pairs;

expanding, by the one or more processors, the blocked airspace description data into a plurality of potential blocked airspace sub-regions, each of the potential blocked airspace sub-regions including a geographical area;

comparing, by the one or more processors, a plurality of flight steps between the plurality of respective latitude-longitude pairs of the flight path to one or more geographic areas associated with each of the plurality of potential airspace sub-regions;

determining, by the one or more processors, one or more intersections between the plurality of flight steps and the plurality of potential airspace sub-regions based on the comparison;

filtering, by the one or more processors, the plurality of potential blocked airspace sub-regions to a list of one or more potential blocked airspaces based on the one or more intersections; and adjusting, by the one or more processors, the flight path based on the list of one or more potential blocked airspaces.

2. The method of claim 1, wherein converting a flight path into a plurality of latitude-longitude pairs comprises converting a plurality of fixes in the flight path into the plurality of latitude-longitude pairs.

3. The method of claim 1, wherein expanding the blocked airspace description data into a plurality of potential blocked airspace sub-regions comprises identifying an ambiguous blocked airspace identifier in the blocked airspace description data and identifying a plurality of blocked airspace regions that encompass the ambiguous blocked airspace identifier.

4. The method of claim 1, wherein expanding the blocked airspace description data into a plurality of potential blocked airspace sub-regions comprises identifying a rule for processing an ambiguous blocked airspace identifier in the blocked airspace description data and applying the rule to the ambiguous blocked airspace identifier, the rule including a format and processing directive.

5. The method of claim 1, wherein expanding the blocked airspace description data into a plurality of potential blocked airspace sub-regions comprises identifying at least one error in the blocked airspace description data and generating a set of blocked airspace identifiers permutations based on the at least one error.

6. The method of claim 1, wherein determining, by the one or more processors, one or more intersections between the plurality of flight steps and the plurality of potential airspace sub-regions comprises determining if a line segment of a given flight steps passes through a geographic area of a potential blocked airspace sub-region.

7. The method of claim 6, wherein determining, by the one or more processors, one or more intersections between the plurality of flight steps and the plurality of potential airspace sub-regions comprises determining if a line segment of a given flight steps intersects at least one border of a geographic area of a potential blocked airspace sub-region.

8. A non-transitory computer-readable storage medium for tangibly storing computer program instructions capable of being executed by one or more computer processors, the computer program instructions defining steps of:

receiving blocked airspace description data;

converting a flight path into a plurality of latitude-longitude pairs;

expanding the blocked airspace description data into a plurality of potential blocked airspace sub-regions, each of the potential blocked airspace sub-regions including a geographical area;

identifying a subset of the potential blocked airspace sub-regions based on comparing flight steps between respective latitude-longitude pairs and geographic areas of the potential blocked airspace sub-regions; and comparing a plurality of flight steps between the plurality of respective latitude-longitude pairs of the flight path to one or more geographic areas associated with each of the plurality of potential airspace sub-regions;

determining one or more intersections between the plurality of flight steps and the plurality of potential airspace sub-regions based on the comparison;

filtering the plurality of potential blocked airspace sub-regions to a list of one or more potential blocked airspaces based on the one or more intersections; and adjusting the flight path based on the list of one or more potential blocked airspaces.

9. The non-transitory computer-readable storage medium of claim 8, wherein converting a flight path into a plurality of latitude-longitude pairs comprises converting a plurality of fixes in the flight path into the plurality of latitude-longitude pairs.

10. The non-transitory computer-readable storage medium of claim 8, wherein expanding the blocked airspace description data into a plurality of potential blocked airspace sub-regions comprises identifying an ambiguous blocked airspace identifier in the blocked airspace description data and identifying a plurality of blocked airspace regions that encompass the ambiguous blocked airspace identifier.

11. The non-transitory computer-readable storage medium of claim 8, wherein expanding the blocked airspace description data into a plurality of potential blocked airspace sub-regions comprises identifying a rule for processing an ambiguous blocked airspace identifier in the blocked airspace description data and applying the rule to the ambiguous blocked airspace identifier, the rule including a format and processing directive.

12. The non-transitory computer-readable storage medium of claim 8, wherein expanding the blocked airspace description data into a plurality of potential blocked airspace sub-regions comprises identifying at least one error in the blocked airspace description data and generating a set of blocked airspace identifiers permutations based on the at least one error.

13. The non-transitory computer-readable storage medium of claim 8, wherein determining one or more intersections between the plurality of flight steps and the plurality of potential airspace sub-regions comprises determining if a line segment of a given flight steps passes through a geographic area of a potential blocked airspace sub-region.

14. The non-transitory computer-readable storage medium of claim 13, wherein determining one or more intersections between the plurality of flight steps and the plurality of potential airspace sub-regions comprises determining if a line segment of a given flight steps intersects at least one border of a geographic area of a potential blocked airspace sub-region.

15. A device comprising:

one or more processors; and a storage medium for tangibly storing thereon logic for execution by the one or more processors, the logic comprising instructions for:

receiving blocked airspace description data;

converting a flight path into a plurality of latitude-longitude pairs expanding the blocked airspace description data into a plurality of potential blocked airspace sub-regions, each of the potential blocked airspace sub-regions including a geographical area;

comparing, by the one or more processors, a plurality of flight steps between the plurality of respective latitude-longitude pairs of the flight path to one or more geographic areas associated with each of the plurality of potential airspace sub-regions;

determining, by the one or more processors, one or more intersections between the plurality of flight steps and the plurality of potential airspace sub-regions based on the comparison;

filtering, by the one or more processors, the plurality of potential blocked airspace sub-regions to a list of one or more potential blocked airspaces based on the one or more intersections; and adjusting the flight path based on the list of one or more potential blocked airspaces.

16. The device of claim 15, wherein expanding the blocked airspace description data into a plurality of potential blocked airspace sub-regions comprises identifying an ambiguous blocked airspace identifier in the blocked airspace description data and identifying a plurality of blocked airspace regions that encompass the ambiguous blocked airspace identifier.

17. The device of claim 15, wherein expanding the blocked airspace description data into a plurality of potential blocked airspace sub-regions comprises identifying a rule for processing an ambiguous blocked airspace identifier in the blocked airspace description data and applying the rule to the ambiguous blocked airspace identifier, the rule including a format and processing directive.

18. The device of claim 15, wherein expanding the blocked airspace description data into a plurality of potential blocked airspace sub-regions comprises identifying at least one error in the blocked airspace description data and generating a set of blocked airspace identifiers permutations based on the at least one error.

19. The device of claim 15, wherein determining one or more intersections between the plurality of flight steps and the plurality of potential airspace sub-regions comprises determining if a line segment of a given flight steps passes through a geographic area of a potential blocked airspace sub-region.

20. The device of claim 19, wherein determining one or more intersections between the plurality of flight steps and the plurality of potential airspace sub-regions comprises determining if a line segment of a given flight steps intersects at least one border of a geographic area of a potential blocked airspace sub-region.

* * * * *